O. SHACKELFORD.
FLY TRAP.
APPLICATION FILED APR. 19, 1916.
1,221,098. Patented Apr. 3, 1917.
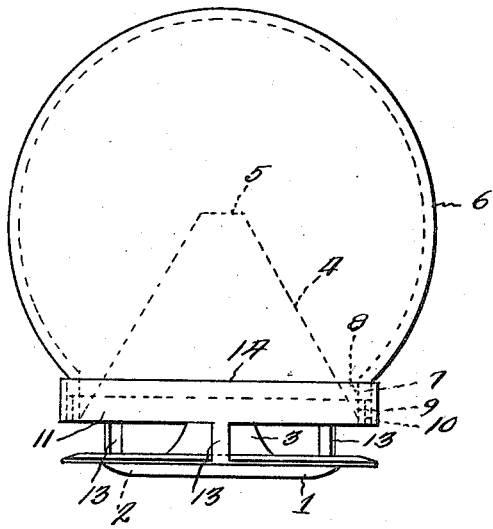
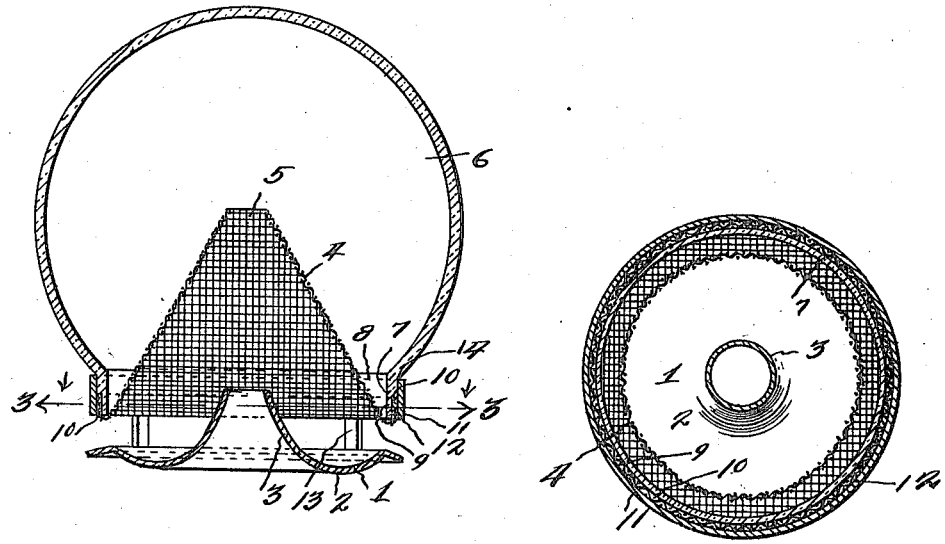

UNITED STATES PATENT OFFICE.

ORIE SHACKELFORD, OF FAIRMONT, WEST VIRGINIA.

FLY-TRAP.

1,221,098.  Specification of Letters Patent.  Patented Apr. 3, 1917.

Application filed April 19, 1916. Serial No. 92,237.

*To all whom it may concern:*

Be it known that I, ORIE SHACKELFORD, a citizen of the United States, residing at Fairmont, in the county of Marion, State of West Virginia, have invented a new and useful Fly-Trap; and I do hereby declare the following to be a full, clear, and exact description of the invention, such as will enable others skilled in the art to which it appertains to make and use the same.

This invention relates to a new and useful fly trap, and an object of the invention is to provide an improved device of this kind which is simple, efficient and practical in construction, and may be manufactured for a small cost and sold at a reasonable profit.

Another object of the invention is to provide a globular inclosure constructed from glass or the like, and into which the flies may be trapped, so that by disposing the globular inclosure in the direct rays of the sun, causing intense heat on the interior of the inclosure, the flies will die from the heat therein.

Another object of the invention is to provide a pan under the glass globular inclosure, to contain food of some suitable kind, in order to attract the flies under the wire fabric cone member (which extends upwardly into globular inclosure) so that after the flies have eaten of the food, they will crawl up the interior surface of the cone, and through the small orifice or opening at the top of the cone, and into the interior of the globular inclosure.

In practical fields details of construction may necessitate alterations falling within the scope of what is claimed.

The invention comprises further features and combination of parts, as hereinafter set forth, shown in the drawings, and claimed.

In the drawings:—

Figure 1 is a view in elevation of the improved fly trap constructed in accordance with the invention.

Fig. 2 is a vertical sectional view through the fly trap.

Fig. 3 is a transverse sectional view on line 3—3 of Fig. 2.

Referring more especially to the drawings 1 designates a suitable pan or receptacle constructed of sheet metal, which constitutes a base for the fly trap. This pan is dished annularly as shown at 2 for the reception of food of some suitable kind as an attraction for the flies. This dished portion 2 merges into a conical part 3 centrally of the pan, so that after the flies have eaten of the food, they will, as a natural consequence, crawl up the conical or tapering part 3, and subsequently ascend or fly toward and alight upon the inner surface of the wire fabric 4, nearest its central portion, so that the flies will crawl up the interior surface of the wire fabric cone and pass out through the opening 5 of said cone shaped member, into the interior of the globular inclosure 6. The lower portion of the glass globular inclosure has an annular flange 7, the opening 8 adjoining which is directly over the pan 1. The flange 7 has a reduced part 9 and an adjoining annular recess 10. The lower part of the wire fabric cone member is bent outwardly and upwardly and into the annular recess 10, there being an annular band 11 fitting over this bent portion 12 of said cone member 4, and into engagement with the flange 7, thereby holding the cone member in place, so as to extend upwardly through the opening 8, and into the globular inclosure. Formed integral with and rising upwardly from the outer edge of the pan are arms 13, which are formed integral with the band 11, so that by virtue of said arms and the band 11, the globular inclosure 6 is firmly supported. As will be noted, the pan 1 is spaced below the band 11, so that the flies may pass between the pan and the lower edge of the band at any suitable point about the trap. The upper edge 14 of the band 11 engages the lower portion of the globular inclosure near the flange 7, as shown at 14, so as to firmly support the globular inclosure. One of the instincts of a fly is that it always crawls upwardly upon a surface, not downwardly, hence, after a fly has been attracted by the food and eaten of the same, it will crawl up the conical or tapered part 3 and pass through the opening 5, or will alight on the interior surface of the cone shaped wire fabric member 4, and subsequently crawl through the opening 5 into the interior of the globular inclosure. Should it be found that the sun at certain times does not cause sufficient heat on the interior of the inclosure, owing to the magnifying tendency of the glass inclosure, to kill the flies, the inclosure may be inverted and the band 11 removed together with the pan 1, so that water may be poured into the inclosure to drown the flies.

The invention having been set forth, what is claimed as new and useful is:—

In a fly trap, a pan constituting a base and provided with a plurality of upwardly extending arms integral with the edge of said pan, a band being of a diameter substantially corresponding to the diameter of the pan and formed integral with the upper parts of the arms and being spaced above the pan, a glass globular inclosure having an annular flanged opening at its lower portion, the flange of which having a reduced portion and an adjoining annular recess and fitting within the band, a wire fabric cone shaped member having a small opening in its top portion, extending through the flanged opening, and into the interior of the inclosure, said wire fabric cone shaped member having its lower outer edge portion bent upwardly into the annular recess of the flange of the globular inclosure and within the band, said pan being dished annularly, said dish portion merging into a centrally arranged conical part extending partially into the wire fabric cone shaped member and substantially conforming to the contour of said fabric member and being arranged axially with the opening at the top of the fabric member.

In testimony whereof I have signed my name to this specification in the presence of two subscribing witnesses.

ORIE SHACKELFORD.

Witnesses:
A. C. ROWAND,
J. L. BELT.

Copies of this patent may be obtained for five cents each, by addressing the "Commissioner of Patents, Washington, D. C."